INVENTORS
William R. Beck
Loy D. Hagenbook
BY
ATTYS.

Sept. 11, 1962 W. R. BECK ETAL 3,053,404
DRIVE SYSTEM FOR SHUTTLE CARS
Filed Feb. 8, 1960 4 Sheets-Sheet 3
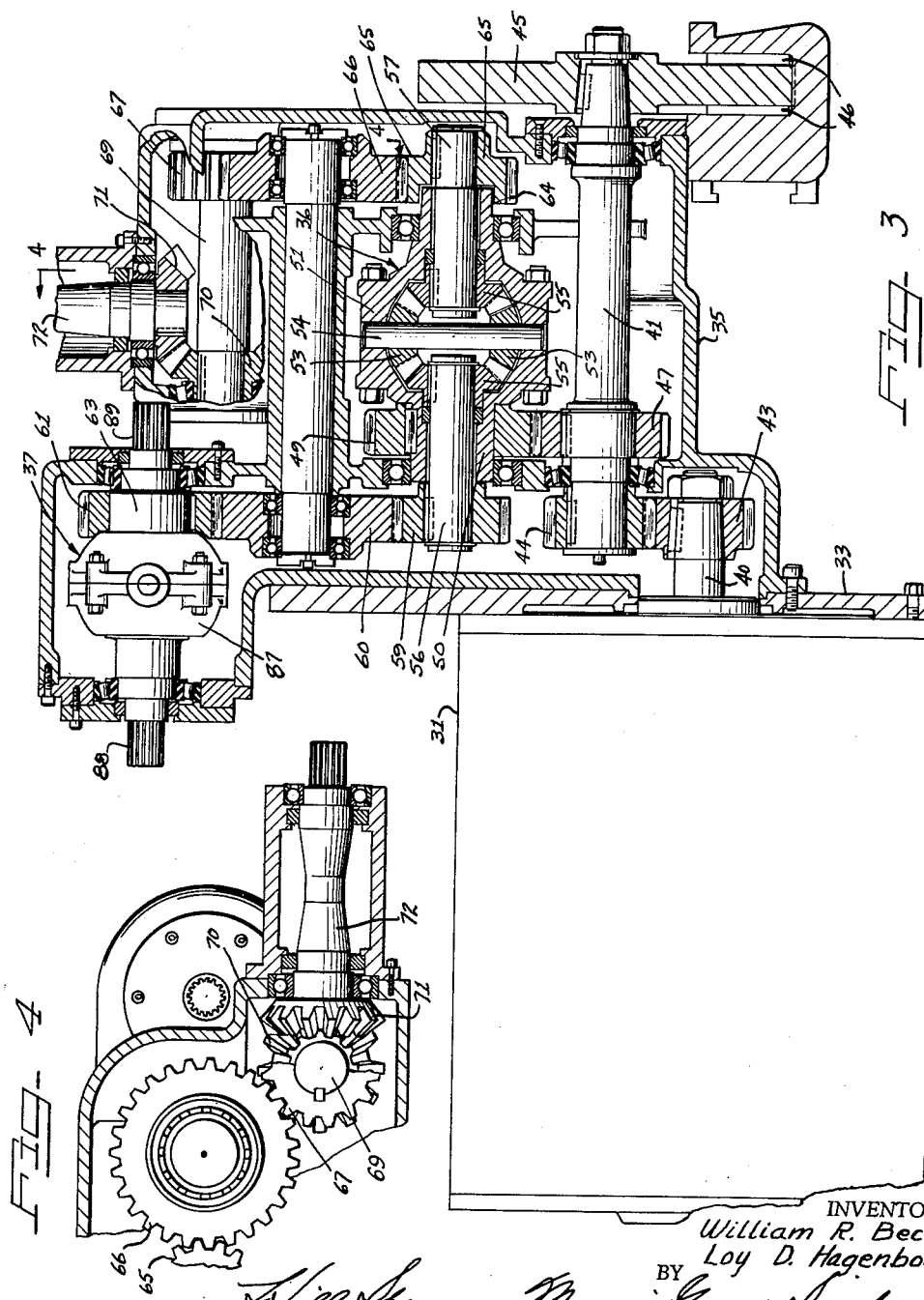
INVENTORS
William R. Beck
Loy D. Hagenbook
BY
ATTYS.

Sept. 11, 1962   W. R. BECK ETAL   3,053,404
DRIVE SYSTEM FOR SHUTTLE CARS
Filed Feb. 8, 1960   4 Sheets-Sheet 4
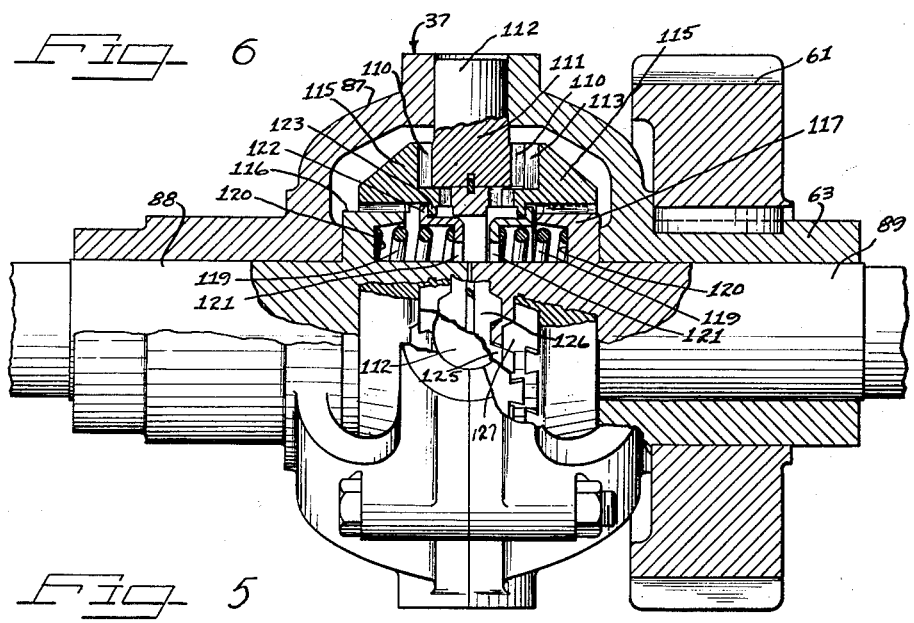
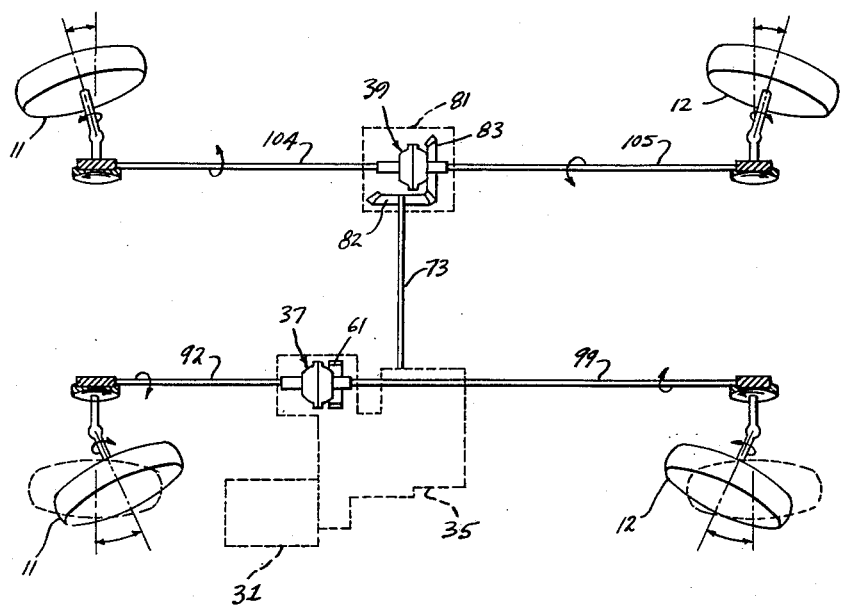
INVENTORS
William R. Beck
Loy D. Hagenbook
BY
ATTYS.

United States Patent Office 3,053,404
Patented Sept. 11, 1962

3,053,404
DRIVE SYSTEM FOR SHUTTLE CARS
William R. Beck, Palos Heights, and Loy D. Hagenbook, Chicago, Ill., assignors to Goodman Manufacturing Company, Chicago, Ill., a corporation of Illinois
Filed Feb. 8, 1960, Ser. No. 7,184
2 Claims. (Cl. 214—83.36)

This invention relates generally to improvements in drive systems for vehicles, such as shuttle cars which are used for haulage in underground mining, and more particularly relates to such a drive system for a four-wheel-drive shuttle car driven by a single motor.

Some of the problems creating special difficulties in the design of a system for driving all four wheels of a mine shuttle car from a single motor are:

(a) The wheels have limited articularity. That is, their up and down movement relative to one another is not great and does not begin to compare with the up and down movement of the wheels in automobiles and trucks. The shuttle car wheels thus, cannot follow all the up and down variations in a mine floor and two diagonally opposite wheels frequently are off the ground. In such a case, tramming power should flow automatically to the other two diagonal wheels to keep the car moving.

(b) Shuttle cars are built low to the ground and frequently get "hung up" when one end of the frame is run up onto a bump or a pile or rock. This lifts the wheels at one end of the car off the ground. In such a case, tramming power must flow automatically to the other two end wheels, to keep the car moving.

(c) Shuttle cars seldom travel on straight roads. They are almost constantly turning to the right and to the left, and the turns are usually sharp. The outside wheels, in a turn, travel faster than the inside wheels. It is not uncommon for the outside wheels to rotate 70% faster than the inside wheels in making a straight turn. With the wheels driven from a single power source, transverse differential mechanism must be provided between the two pairs of wheels on each side of the vehicle to feed power to the wheels at the speed differences that exist under different turning conditions. Since constant turning is a normal aspect of shuttle car operations, the transverse differential mechanism must be exceedingly rugged.

(d) Mine roadways are full of holes and bumps, and a smooth floor is the exception, not the rule. This causes momentary speed variations to occur between the front and rear wheels on each side of the shuttle car and requires a differential mechanism between each pair of front and rear wheels to feed power to the front and rear wheels at the speed differences that exist when the roadway is bumpy. This differential mechanism will hereinafter be referred to as "longitudinal" to distinguish it from the "transverse" differential mechanism mentioned in paragraph (c) above.

(e) The steering wheels of the shuttle car are commonly mounted outboard of their kingpins. This causes the fore and aft wheels on either side of the vehicle to rotate at different speeds during the time the steering wheel is being turned to turn the wheels for steering and thereby requires a longitudinal differential mechanism between each pair of front and rear wheels.

The present invention is primarily concerned with a combination of differential mechanisms for driving a shuttle car, which automatically shifts during traction to the two remaining wheels when any two other wheels are off the ground or are on slippery ground, regardless of whether the two remaining wheels are the front pair of wheels, the rear pair of wheels, either diagonal pair of wheels or either side pair of wheels.

The following three types of differentials have been found to be useful in the drive to the wheels of the shuttle car when properly arranged in accordance with the present invention:

I. *Standard type of differential used in most automobile rear ends.*—This is a simple and rugged differential and divides the traction evenly between the two wheels. Such a differential has been found to be useful form of transverse differential.

II. *Automatic locking or no-spin type of differential.*—This is more complicated and less rugged than the standard type of differential, but locks the two wheels together when one is on slippery ground or is off the ground, automatically throwing the tractive effort to the wheel on solid ground, and preventing the one wheel from spinning. This has been found to be a useful form of longitudinal differential in the system of the present invention. It keeps the front and rear wheels locked together when one tries to slip or spin, yet automatically provides the necessary differential action when the front and rear wheels rotate at different speeds and provides long service life because it is not required to constantly differentiate.

III. *High or multiplying traction type of differential.*—This is somewhere between the two previously mentioned types of differentials in simplicity and in operation. When one wheel starts to slip, it automatically applies some additional tractive effort to the other wheel. A so-called (75-25) multiplying traction differential, for example, applies an intermittent tractive effort to the non-slipping wheel, which is three times the tractive effort between the slipping wheel and the ground. This is enough tractive effort even if the front and rear wheels are both on slippery ground, to throw enough traction on the opposite wheels to keep the vehicle moving. For this reason, the multiplying traction type of differential is preferred for the transverse differential.

The drive system for a single motor, four-wheel-drive vehicle using the principles of the present invention, therefore, includes the following major features:

(1) The front and rear wheels on each side of the vehicle are interconnected by and driven through automatic locking or no-spin types of differentials.

(2) The two pairs of front and rear wheels on opposite sides of the vehicle are interconnected by and driven through either a standard or a multiplying traction type of differential.

A principal object of the present invention is to improve upon the drive systems for shuttle cars and the like by providing a single motor to drive all four wheels of the car, and by so arranging the drives to the four wheels that the car will pull itself along rough or slippery ground when any two wheels of the car are in engagement with the ground.

A further object of the invention is to provide a more efficient and compact drive for a four wheel drive shuttle car and the like, by utilizing a single motor and differential on one side of the shuttle car as the source of power for driving the car and by driving individual automatic locking differentials on each side of the car, from the single motor and differential.

Another object of the present invention is to provide an improved drive for shuttle cars and the like utilizing a single motor for driving all four wheels of a shuttle car, with individual locking differentials in the drives to the front and rear wheels on each side of the car, in which the locking differentials are driven through a traction multiplying differential, to provide a drive to at least two wheels of the car, as long as one wheel on each side of the car has engagement with the ground, even though a wheel on one side of the car may be on slippery ground.

These and other objects of the invention will appear from time to time as the following specification proceeds and with reference to the accompanying drawings wherein:

FIGURE 3 is a horizontal sectional view taken through the drive mechanism and showing the drive to one limited torque coupling or differential on one side of the car.

FIGURE 4 is a fragmentary sectional view taken substantially along line 4—4 of FIGURE 3;

FIGURE 5 is a diagrammatic view, diagrammatically illustrating the conditions encountered when steering the car about a corner; and FIGURE 6 is a fragmentary sectional view taken through one of the locking differentials.

Figure 1:
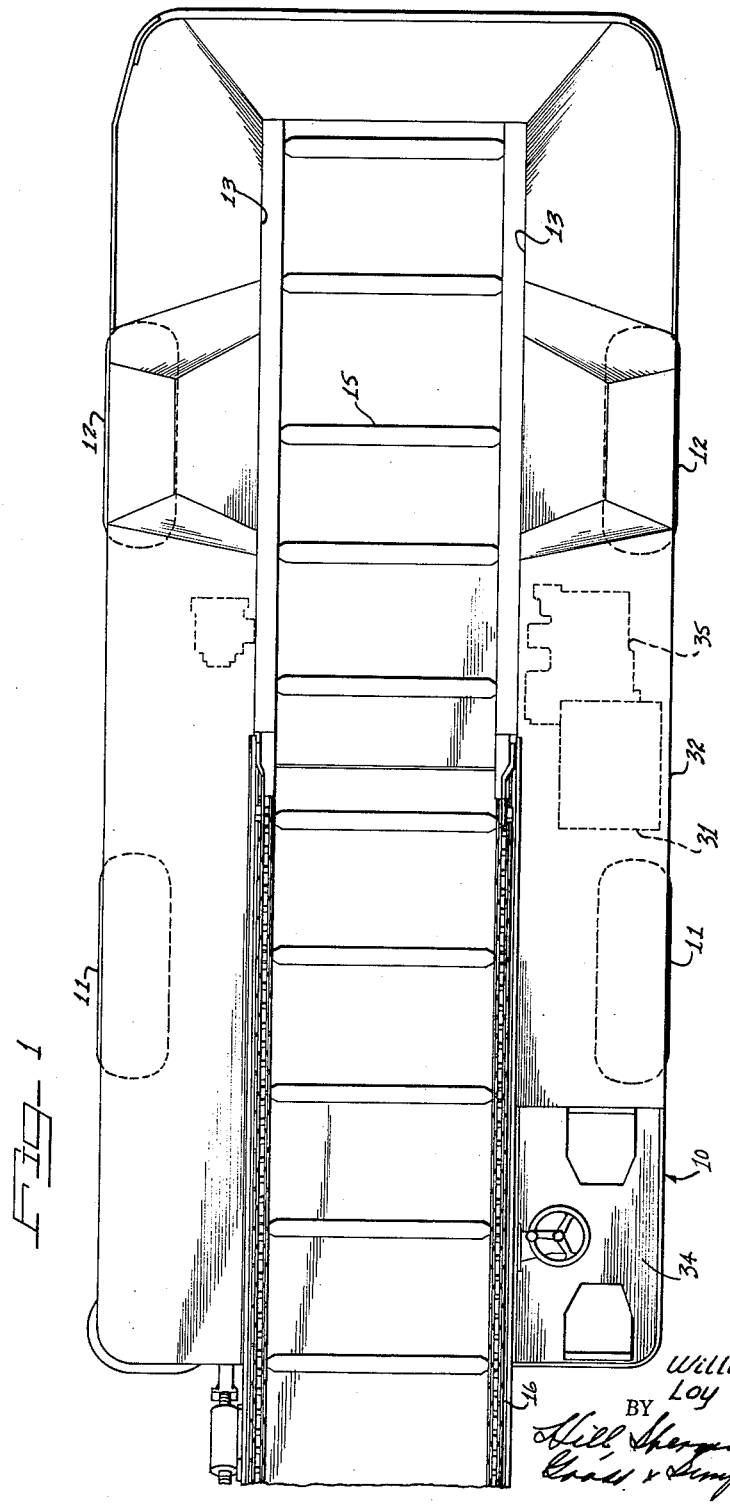
FIGURE 1 is a top plan view of a shuttle car of a type operable in mines underground and driven through a drive system constructed in accordance with the invention.
Figure 2:
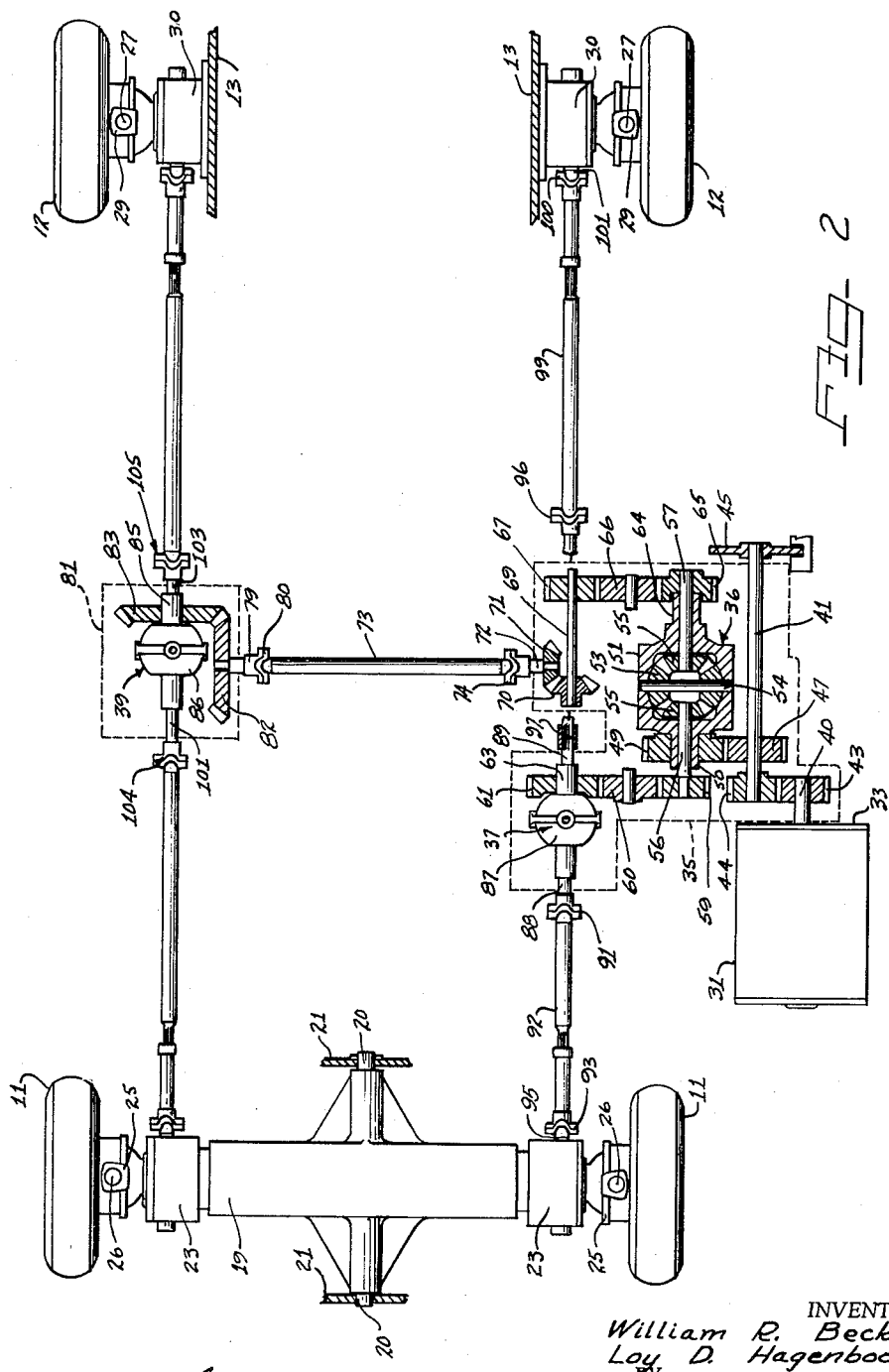
FIGURE 2 is a diagrammatic view illustrating the drive to the four wheels of the car.

In the embodiment of the invention illustrated in the drawings, we have shown in FIGURE 1 a shuttle car 10 of a type operable in mines underground for transporting material from a loading machine or a continuous mining machine to a central loading station, to be transported from the mine by conveyors, mine cars and the like. The shuttle car 10 is supported on rubber tire mounted front steering and drive wheels 11 and rear rubber tire mounted steering and drive wheels 12, and includes a frame having parallel spaced side walls 13 extending for substantially the length thereof having a conveyor 15 guided for movement therebetween for progressing the material between said side walls and over and along an inclined elevating portion 16 of the conveyor, for discharge into a central loading station or a main line conveyor or other material carrying means, for transporting the mined material from the mine.

The front wheels 11 are mounted on opposite ends of a transverse axle 19, trunnioned intermediate its ends on trunnion pins 20, extending along the longitudinal center line of the shuttle car and pivotally supporting the forward end portion of the car in spaced brackets 21 depending from the bottom of the car.

The axle 19 supports gear housings 23 at opposite ends thereof, housing the drive gearing for driving the individual wheels, such as worm and worm gear drives (not shown), conventionally used to drive the wheels of shuttle cars and the like. The gear housings 23 form supports for spindle mounting brackets 25 having steering spindles 26 journalled therein in vertically spaced relation with respect to each other, and forming steering spindles for the wheels 11, mounting the wheels for steering in a manner well known to those skilled in the art so not herein shown or described further.

The rear wheels 12, like the front wheels 11, are mounted on steering spindles 27 journalled in spindle bracket members 29, projecting outwardly from gear housings 30, housing the reduction gearing for driving said rear wheels. The gear housings 30 are shown as being mounted on the outside of the side walls 13 and as projecting laterally therefrom.

A drive motor 31 is suitably mounted beneath an apron 32 projecting laterally from a side wall 13 over a front drive wheel 11, and terminating at its forward end in a downwardly spaced operator's platform 34. The drive motor 31, as shown in FIGURE 3, has an end plate 33 having a gear housing 35 secured to and projecting therefrom and forming a housing for a transverse differential 36, and for a longitudinal differential 37 spaced inwardly of the differential 36 and shown in FIGURE 6 as being an automatic locking type of differential. The gear housing 35 also houses the gearing for driving the differential 36 from the motor 31 and the gearing for driving the automatic locking differential 37, and for driving a longitudinal differential 39 on the opposite side of the vehicle from the differential 37 which also is an automatic locking type of differential like the differential 37.

The motor 31 has a motor shaft 40 extending within the gear housing 35 and driving a parallel shaft 41 through a motor pinion 43 and a meshing spur gear 44 on the parallel shaft 41. The shaft 41 extends outwardly of the gear housing 35 and has a brake disk 45, keyed or otherwise secured to its outer end, opposite faces of which brake disk are engaged by brake shoes 46. The brake shoes 46 may be hydraulically operated and form a hydraulic braking means for the vehicle. The shaft 41 has a gear 47, keyed or otherwise secured thereto, meshing with a gear 49 keyed or otherwise secured to a hub 50, extending laterally from a casing 51 for the differential 36.

The differential 36 may be a standard type of differential or a high or multiplying traction type of differential and for the purpose of simplicity is herein shown as being a standard type of differential of a well known form, it being understood that a high traction type of differential of a conventional form may also be used and in many cases is a preferred form of differential. The differential 36 is shown as having differential pinions 53 rotatably mounted in the casing 51 on a transverse shaft 54 and meshing with drive gears 55, 55 keyed or otherwise secured to the inner ends of drive shafts 56 and 57. The drive shaft 56 is journalled within and projects outwardly from the hub 50 and has a gear 59 keyed or otherwise secured thereto, meshing with an idler gear 60. The idler gear 60 meshes with and drives a gear 61, keyed or otherwise secured to a hub 63 for the locking differential 37.

The drive shaft 57 is journalled within a hub 64 for the casing 51, projecting oppositely from the hub 50. The drive shaft 57 projects outwardly of the hub 64 and has a pinion 65 keyed or otherwise secured thereto meshing with a gear 66, which in turn meshes with a gear 67 on a shaft 69, journalled within the gear housing 35 and having a bevel pinion 70, keyed or otherwise secured thereto. The bevel pinion 70 meshes with a bevel pinion 71 on a transverse shaft 72, spaced beneath the upper run of the conveyor 15. The transverse shaft 72 has driving connection with a coupling shaft 73 through a universal coupling 74. The coupling shaft 73 extends across the vehicle, and may extend between the upper and lower runs of the conveyor 15, and has driving connection with a transverse shaft 79 at the opposite end of the vehicle from the transverse shaft 72, through a universal coupling 80. The transverse shaft 73 extends within a housing 81, and is suitably journalled therein and has a bevel gear 82 mounted on its inner end, meshing with and driving a bevel gear 83, keyed or otherwise secured to a hub 85 for a casing 86 for the automatic locking differential 39.

The differential 36 thus forms a drive to the two automatic locking differentials 37 and 39, and a drive to the wheels 11 and 12 on each side of the vehicle, and provides a differential action between the wheels on each side of the vehicle, when the vehicle is turning a corner.

The automatic locking differential 37 includes a differential casing 87 having drive shafts 88 and 89 journalled in the hubs thereof and extending from opposite sides thereof. The drive shaft 88 serves to drive a front wheel 11 through a universal coupling 91, an extensible drive shaft 92, a universal coupling 93 driven by said extensible drive shaft, and a shaft 95 journalled in the gear housing 23. The shaft 89 serves to drive a universal coupling 96 through a coupling 97. The universal coupling 96 in turn drives an extensible coupling shaft 99 which in turn drives a universal coupling 100 driving a drive shaft 101 journalled within the gear housing 30, for driving the rear wheel 12 on one side of the vehicle.

The drive from the automatic locking differential 39 on the opposite side of the vehicle from the automatic locking differential 37, includes oppositely extending drive shafts 101 and 103 journalled in the hubs of the casing 86 for the automatic locking differential 39, and having drive connection with the front and rear wheels 11 and 12 through extensible universal drive connections 104 and 105 respectively, for driving said wheels in the same manner the wheels on the opposite side of the vehicle are driven.

The automatic locking differentials 37 and 39 serve as couplings between the front and rear wheels and serve to take up twist in the drive shafts to the front and rear wheels when one shaft tends to move contra to the other, as when the wheels are being turned for steering, in one direction or another, while the car is traveling or when the car is traveling up or down a hill and the rear wheels are on the hill, while the front wheels are on the level and vice versa or where the wheels are traversing over uneven ground. The differentials 37 and 39 are each of a similar construction and may be a well known form of automotive no-spin differential. The differentials 37 and 39 shown herein may be of a type known to the trade as the "Detroit no-spin differential," although they may be of various other forms. Only one differential, therefore, need herein be shown and described, and said differentials need not be described in detail herein.

The automatic locking differential 37, as shown in FIGURE 6, includes oppositely facing outer annular drive teeth 110 extending laterally from opposite sides of a drive ring 111, mounted within the casing 87 on pins 112, shown as extending radially outwardly from said drive ring and formed integrally therewith. The pins 112 are suitably mounted between the halves of the differential casing 87. The drive teeth 110 mesh between driven teeth 113, corresponding to the teeth 110 and extending laterally inwardly from drive members 115. The drive members 115 are shown in FIGURE 6 as having internal teeth meshing with external gears 116 and 117, shown as being formed integrally with the shafts 88 and 89 respectively.

The teeth 113 are maintained in engagement with the teeth 110 by compression springs 119. The compression springs 119 are seated in recessed portions 120 of the gears 116 and 117, at one of their ends and are seated on cages 121 at their opposite ends. The cages 121 have flanged portions 122 engaging radially inwardly extending ribs 123 of the drive members 115, to bias the teeth 113 into mesh with the teeth 110.

Either set of teeth 113 may be released from the associated teeth 110 when the torque reactions on the shafts 88 and 89 become unequal and one shaft rotates faster than the other and upon the tendency of the shafts 88 and 89 to rotate contra to each other as when the wheels are being turned for steering and the wheels are driven by the motor 31, by means of camming teeth 125. The camming teeth 125 extend laterally from opposite sides of a camming ring 126, extending within the drive ring 111 and keyed or otherwise secured thereto, for rotation therewith, which are provided to ratchet the slow wheel in either direction of travel of the car. The camming teeth 125 mesh with camming teeth 127 on the drive members 115 and spaced radially inwardly of the drive teeth 113.

Thus, upon the tendency of one shaft to rotate contra to the other, the camming teeth 125 driving the slower wheel will exert a camming action on the teeth 127 of the drive member tending to rotate contra to the direction the casing 87 is driven by the gear 61. This will cam the associated drive member 115 against the spring 120, and will bring the teeth 113 to ratchet out of mesh with the teeth 110, and will, thereby, accommodate relative rotation between the shafts 88 and 89 and travel of the car at the speed of the faster wheel.

In FIGURE 5, we have diagrammatically shown the contra twisting actions on the front and rear drive shafts when the wheels are turned for steering. It will be noted from this figure that the wheels are offset a substantial distance outwardly from the steering spindles or kingpins 27 and that as the wheels are turned, the front and rear wheels will roll together in opposite directions with respect to each other. This will tend to reverse the direction of rotation of the rear wheel and will place a twisting force on the axle for the rear wheel which is contra or reverse to the direction the wheel is being driven. This will place a similar twisting force on the associated drive shaft. The drive shafts for the front and rear wheels thus tend to rotate in reverse directions with respect to each other during the operation of turning the wheels for steering, but the reverse rotating forces will be relieved after the wheels have been turned into the desired position. These opposite twisting forces on the drive shafts for the front and rear wheels will, therefore, tend to cam one set of teeth 113 out of engagement with the teeth 110 during the operation of turning the wheels for steering, and thereby obviate the contra twisting forces on the two drive shafts.

Thus, the transverse differential 36 provides differential action to the wheels on each side of the vehicle, while the longitudinal automatic locking differentials 37 and 39 in effect serve as double ratcheting reversible couplings for the front and rear wheels on each side of the vehicle, to drive the wheels at the same rates of speed, and to provide a differential action between the front and rear wheels when the wheels are turned for steering, or are travelling along varying grades or rough or irregular ground.

It may be seen from the foregoing that since the front and rear wheels on each side of the vehicle are connected to be driven by longitudinal automatic locking differentials, assuring that there will always be a drive action to one wheel on each side of the vehicle, and since the automatic locking differentials are driven by a transverse differential, the required differential action between the wheels on each side of the vehicle is attained, and as long as a pair of front, a pair of rear or a pair of diagonal wheels is in engagement with the ground, there will be a positive drive to each side of the vehicle, regardless of road conditions.

It should further be understood that where the transverse differential is a standard differential, the car will pull itself under all conditions where one wheel on each side of the car has traction with the ground, and that where the transverse differential is a traction multiplying differential, the car will pull itself even where the wheel or wheels on each side of the car may be on slippery ground.

While we have herein shown and described one form in which our invention may be embodied, it may be understood that various variations and modifications in the invention may be attained without departing from the spirit and scope of the novel concepts thereof as defined by the claims appended hereto.

We claim as our invention:

1. In a shuttle car,
    a. a frame having parallel spaced side walls extending for substantially the length thereof,
    b. an endless chain and flight conveyor extending along said frame between said side walls and forming the bottom of said frame,
    c. four drive and steering wheels supporting said frame,
    d. coupling means mounted on said frame on the outsides of said side walls intermediate the ends thereof, coupling the front and rear wheels for rotation together and accommodating relative rotation of said wheels with respect to each other,
    e. each coupling means including an automatic locking type double ratcheting reversible differential including a housing rotatably journalled on said frame having
    f. aligned independent drive shafts extending from opposite ends thereof parallel to the side walls of said frame,
    g. extensible universal drive connections from said independent drive shafts to associated vehicle wheels h. a motor mounted on said frame on the outside of one of said side walls, a gear housing extending from said motor and having a differential housing rotatably journalled therein for rotation about an axis parallel to the axes of rotation of said drive shafts, i. a gear drive connection from said motor to said differential housing, j. differential drive shafts journalled in said housing and extending from opposite ends thereof and driven from said differential, k. gearing driven by one of said differential drive shafts for driving one of said automatic locking type double ratcheting reversible differential housing, l. a geared drive connection from the other of said differential drive shafts for driving said other automatic locking type double ratcheting reversible differential housing, said last mentioned drive connection including a transverse shaft disposed beneath the upper run of said conveyor.

2. In a shuttle car for transporting mined material underground in mines, a. a frame having parallel spaced side walls extending along opposite sides thereof for substantially the length thereof, b. a chain and flight conveyor having a material carrying run extending between said side walls, c. four drive and steering wheels supporting said frame, d. a transverse axle pivoted to said frame for movement about an axis extending longitudinally of said frame, e. steering spindles supporting said wheels for steering, f. two of said steering spindles being mounted on opposite ends of said axle and g. two other of said spindles being mounted directly on said frame on the outside of said side walls and all of said steering spindles being in inwardly spaced relation with respect to said wheels, h. a motor mounted on said frame outside of one of said side walls, i. a housing extending from one end of said motor, j. a differential rotatably mounted within said housing and including k. a housing, l. two coaxial drive shafts journalled within said housing and dividing the power of said motor, m. a geared drive connection from said motor to said differential housing, n. two extensible universal drive shafts on each side of said frame extending parallel to said side walls, each drive shaft having driving connection with one of said wheels, o. means driving said drive shafts comprising a no-spin double ratcheting drive coupling on each side of said frame between the adjacent ends of said drive shafts, p. each coupling comprising a housing rotatably journalled on said frame on the outside of an associated side wall and q. independent drive shafts journalled in said housing and extending from opposite ends thereof, each drive shaft having drive connection with an associated universal drive shaft, r. a geared drive connection from one of said differential drive shafts to one coupling housing on the same side of said frame as said differential, s. a geared drive connection from the other differential drive shaft to the coupling housing on the opposite side of said frame from said differential including a single shaft extending transversely of said frame beneath the material carrying run of said conveyor, t. said couplings being no-spin double ratcheting reversible differentials having releasable drive means contained within the housings thereof, releasing the drive to one wheel upon the tendency of said wheel to rotate contra to and at a different speed than the speed of rotation of the other wheel.

References Cited in the file of this patent

UNITED STATES PATENTS

| | | |
|---|---|---|
| 2,395,333 | Lee | Feb. 19, 1946 |
| 2,488,520 | Beck | Nov. 22, 1949 |
| 2,667,087 | Myers | Jan. 26, 1954 |